Patented May 23, 1933

1,910,684

UNITED STATES PATENT OFFICE

MILTON D. FARRAR, OF URBANA, ILLINOIS, ASSIGNOR TO STANDARD OIL COMPANY (INDIANA), OF CHICAGO, ILLINOIS, A CORPORATION OF INDIANA

TREE SPRAY

No Drawing.   Application filed May 21, 1930. Serial No. 454,524.

This invention relates to a tree spray and it pertains more particularly to a spray which may be safely used on sensitive foliage.

An object of my invention is to provide a non-injurious tree spray which will act as an effective insecticide and fungicide, which can be prepared, shipped and handled in powdered form and which can be readily and completely emulsified in a spray mixer. A further object is to provide an oil tree spray in which sulfur can be used as a toxic ingredient without injuring the foliage. A further object is to provide a spray which covers foliage thoroughly and which is effective for a relatively long period of time. Other objects will be apparent as the detailed description of my invention proceeds.

Instead of emulsifying oil in water, as has heretofore been the practice, I mix the oil with a sufficiently large amount of powdered lime to form a substantially dry powdery or fluffy mass. This fluffy mass may be packed in paper bags for convenience in handling and shipping. In the orchard the powdery mass is mixed into a paste with a small amount of water and then diluted to the desired extent in a spray mixer.

To prevent oil from separating out in the dilution step, I incorporate a small amount of casein in the powdered mixture and I may increase the toxicity of the spray by adding powdered sulfur, lead arsenate, monochloronaphthalene, etc. The invention will be more clearly understood from the following detailed description of a preferred embodiment.

The basic ingredients of my improved spray are oil and hydrated lime. The oil is preferably a highly refined petroleum oil having a viscosity of about 50 to 150 sec. Saybolt at 100° F. and a specific gravity of about 0.89 to 0.81. In petroleum technology such oils are commonly called "white oils" and are exemplified by Nujol, Stanolax, Acme White oil, Russian Mineral oil, etc. I may use oils of lesser degrees of refinement and of various physical and chemical characteristics for application on relatively resistant plants, and I do not limit myself to any particular oil.

The hydrated lime is preferably very finely powdered and it may be of commercial purity. Other solids, such as talc, gypsum and bentonite may be used instead of or combined with the lime, but I have found that the powdered lime gives superior results.

A preferred formula for my tree spray is:

Hydrated lime _____ 15 lbs.
White oil _____ ½ gal.
Casein _____ .38 lbs.

The oil is thoroughly mixed with the solid ingredients in any suitable apparatus, for example, the mixture may be passed through screens of about ten mesh so that the solids will adsorb a uniform amount of the oil. The above proportions may be varied throughout a considerable range, but for practical purposes, the amount of oil used should not be sufficient to yield a sticky or pasty mass.

Instead of using casein in the above formula, I may use about 2% of gum arabic or an equivalent amount of gum ghatti, dehydrated sulfite liquor or other materials which have an emulsifying action.

The powder will keep indefinitely, and since it is relatively dry no preservative is necessary for the casein. The dry powder may be shipped to the orchards in paper bags and may be mixed with water to form a spray, about 20 pounds of powder being incorporated in about 50 gals. of water. The amount of water will, of course, vary within wide limits, and it is usually desirable to proportion the mixture so that the oil content in the final spray will be from ½ to 2%.

When this emulsified mixture is sprayed onto the foliage, it does not cling thereto in large drops but it spreads evenly, adheres closely to the leaves and gives a smooth, uniform coverage which is superior to that obtained by prior sprays. This is a particularly important feature because it insures the effectiveness of the spray, and it makes frequent and/or repeated spraying unnecessary.

Heretofore sulfur has been avoided in oil sprays because of its injury to plant foliage. Ordinarily sulfur, when combined with oil, causes the leaves to burn and curl up. I have discovered that sulfur in amounts to about 15% (calculated on the dry powder basis) may be mixed with my spray and used on sensitive foliage with safety. I find that other toxic ingredients, such as lead arsenate, monochloronaphthalene and their equivalents, may also be employed. For instance, 0.1% monochloronaphthalene (calculated on the diluted spray) has been added to my spray and has been found effective without apparent injury to sensitive plant tissue. I have developed no theory to explain why normally injurious elements, such as sulfur, are rendered non-injurious when applied with a lime-oil spray of the character described, but experiments have proven this to be a fact.

I have found my improved spray particularly effective for combating the oriental fruit moths which infest the sensitive leaves of peach trees. It may also be used against codling moths, red spider, aphids, scale insects and other insect and fungus pests.

The term "refined oil" as used in the following claims includes relatively viscous oils which have been treated to remove the unsaturated hydrocarbons or other compounds which may be injurious to foliage.

While I have described my invention in detail, it is understood that I do not limit myself to the proportions or ingredients specified except as defined by the following claims.

I claim:

1. A tree spray comprising a white oil, sulfur, and means comprising powdered lime for rendering the sulfur non-injurious to foliage.

2. A method of making a tree spray which comprises mixing a refined petroleum oil with powdered hydrated lime to form a powdery mass, transposing said mixture in its powdery form to a point of application, mixing said powdery mass with water to form a paste, and diluting said paste to form an emulsion containing from ½ to 2% oil.

3. The method of making a tree spray which comprises mixing refined petroleum oil with powdered lime and an emulsifying agent, transposing said mixture in a powdery form to a point of application, mixing water with said powdery mixture to form a paste, and diluting the paste to form an emulsion containing about ½ to 2% oil.

4. An aqueous tree spray emulsion base comprising a refined petroleum oil incorporated in powdered lime mixed with an emulsifying agent.

5. An aqueous tree spray emulsion base comprising ingredients in about the following proportions:

Refined petroleum oil _____ ½ gallon
Lime _____ 15 pounds
Emulsifier _____ .3 to .4 pounds Signed this 11 day of May, 1930, at Urbana, in the county of Champaign, State of Illinois.

MILTON D. FARRAR.